United States Patent [19]

Austin et al.

[11] Patent Number: 5,155,197
[45] Date of Patent: Oct. 13, 1992

[54] COPOLYMER OF PROPYLENE AND TRANS-1,4-HEXADIENE AND METHOD FOR PREPARATION THEREOF

[75] Inventors: Richard G. Austin, Kingwood; Bradley P. Etherton, Houston, both of Tex.

[73] Assignee: Exxon Chemical Patents Inc., Linden, N.J.

[21] Appl. No.: 493,177

[22] Filed: Mar. 14, 1990

[51] Int. Cl.⁵ .......................................... C08F 236/20
[52] U.S. Cl. ................... 526/336; 526/125; 526/136; 526/905; 522/157; 522/158; 522/912; 264/22
[58] Field of Search ............... 526/336, 905, 125, 136; 522/158, 157; 264/22

[56] References Cited

U.S. PATENT DOCUMENTS

| | | | |
|---|---|---|---|
| 3,291,780 | 12/1966 | Gladding et al. | 526/336 X |
| 3,554,988 | 1/1971 | Emde et al. | 525/331.8 |
| 3,880,819 | 4/1975 | Natta et al. | 526/336 X |
| 4,064,335 | 12/1977 | Lal et al. | 526/336 X |
| 4,102,761 | 7/1978 | Böhm et al. | 526/336 X |
| 4,366,296 | 12/1982 | Kitagawa et al. | 526/77 |
| 4,366,318 | 12/1982 | Cain, deceased et al. | 546/106 |
| 4,680,318 | 7/1987 | Fuji et al. | 521/95 |

OTHER PUBLICATIONS

Coucise Chem. and Tech. Dictionary, H. Bennett (ed.) Chemical Publishing Co., Inc., N.Y., 279, 1974.

Primary Examiner—Fred Teskin
Attorney, Agent, or Firm—Myron B. Kurtzman; Catherine L. Bell

[57] ABSTRACT

A copolymer of trans-1,4-hexadiene and propylene, and a method for its preparation. The copolymer is isotactic, essentially free of cis-1,4-hexadiene, and contains from 0.01 to 5 mole percent 1,4-hexadiene. The copolymer is radiation-stabilized against molecular weight degradation, and cross-links to form gel upon exposure to radiation. The copolymer is prepared by contacting a mixture of propylene and 1,4-hexadiene essentially free of cis-1,4-hexadiene with a coordination catlyst, e.g. Ziegler-Natta catalyst, under copolymerization conditions. Hydrogen is used to moderate the molecular weight of the copolymer and enhance the catalyst activity.

20 Claims, No Drawings

COPOLYMER OF PROPYLENE AND TRANS-1,4-HEXADIENE AND METHOD FOR PREPARATION THEREOF

FIELD OF THE INVENTION

The present invention is directed to a propylene copolymer which is radiation stabilized against molecular weight degradation and therefore may be subjected to radiation and cross-linked thereby. More particularly, the invention relates to a copolymer of propylene and 1,4-hexadiene, and a method for its preparation.

BACKGROUND OF THE INVENTION

The advantages of cross-linking polymers by either chemical or irradiation techniques are well known. Cross-linking processes are used extensively in such fields as electrical insulation, foam and other industries. Some polyolefins such as polyethylene are especially suitable for chemical and irradiation cross-linking. However, polypropylene is prone to chain scission when subjected to high energy radiation, and as a result severe deterioration of the mechanical properties of irradiated polypropylene becomes a substantial problem. As a consequence, few industrial applications involving irradiation of polypropylene are found.

One significant application of industrial radiation sources is the sterilization of disposable medical devices such as sutures, syringes, bandages, labware and the like. The use of gamma rays from cobalt-60 sources is common although electron beam irradiation is also utilized. Polypropylene is used in some of the medical devices, and thus in sterilization applications. One significant problem still persists, namely the deterioration of polypropylene with time after radiation sterilization of the molded material.

U.S. Pat. Nos. 4,366,296 and 4,680,318, both assigned to Mitsubishi Petrochemical Company, disclose copolymers of propylene and branched 1,4-dienes such as 4-methyl-1,4-hexadiene or 5-methyl-1,4-hexadiene. U.S. Pat. No. 4,680,318 is specifically directed to foaming resin compositions and a method of producing radiation cross-linked foams. In both the '296 and '318 patents, the branched 1,4-diene formula used to define the dienes copolymerized with the propylene and ethylene specifically excludes 1,4-hexadiene. In "Comparative Example C1" of U.S. Pat. No. 4,366,296, an example is given of the copolymerization of propylene and cis-1,4-hexadiene, but it is stated that (1) it is difficult to control molecular weight with the addition of hydrogen to the polymerization reactants, (2) cis-1,4-hexadiene reduces the catalyst activity and (3) the heptane insolubles and bulk density of the copolymer are substantially lowered when cis-1,4-hexadiene is copolymerized with propylene.

SUMMARY OF THE INVENTION

The present invention is directed to a copolymer of propylene and 1,4-hexadiene. The copolymer and its preparation result from the discovery that the trans isomer of 1,4-hexadiene readily copolymerizes with propylene using a coordination catalyst. The catalyst has high activity in the presence of the trans-1,4-hexadiene, that activity being enhanced by the presence of any hydrogen which may be used to facilitate molecular weight control. In contrast, cis-1,4-hexadiene is known to deactivate the catalyst and makes molecular weight control difficult. Crystalline thermoplastic copolymers having many of the advantageous characteristics of propylene homopolymer are included within the characteristics of this specific copolymer. In particular, the copolymer of the present invention is radiation-resistant and cross-links upon irradiation. This results in several positive effects on the polymer properties in contrast to the well-known negative effects of radiation on polypropylene which usually include the degradation (loss of molecular weight) of the polypropylene. Thus, the copolymer of the present invention has various applications, including radiation sterilization, especially in connection with disposable medical devices made from the copolymer.

Broadly, the invention provides a copolymer comprising propylene and trans-1,4-hexadiene. The hexadiene employed to prepare the copolymer is preferably essentially free of the cis-isomer, essentially free meaning, at least 85 percent trans-1,4-hexadiene, more preferably at least 90 percent, and especially at least 95 percent trans-1,4-hexadiene. The copolymer is radiation cross-linkable and suffers only small molecular weight degradation resulting from irradiation. Depending upon the radiation dosage, the copolymer may be cross-linked to a gel content of from 5 to 75 weight percent. The copolymer thus lends itself to use in medical devices and other applications wherein the copolymer is exposed to radiation.

The invention also provides a method for copolymerizing propylene and trans-1,4-hexadiene. The method comprises polymerizing propylene in a reaction mixture including trans-1,4-hexadiene and a coordination polymerization catalyst. The reaction mixture includes sufficient 1,4-hexadiene to obtain a copolymer containing from 0.01 to 5 mole percent 1,4-hexadiene. The reaction mixture is essentially free of cis-1,4-hexadiene, for example, the hexadiene comprises at least 85 percent of the trans isomer, so that the catalyst is not substantially deactivated by the hexadiene comonomer, and also so that the molecular weight of the copolymer prepared using the method can be controlled by the amount of hydrogen added to the reaction mixture. Optionally, the method may further include forming the copolymerization reaction product into a shaped article, and irradiating the shaped article to produce the final product.

DETAILED DESCRIPTION OF THE INVENTION

The 1,4-hexadiene is employed in the copolymer of the present invention so that the copolymer contains from 0.01 to 5 mole percent hexadiene, preferably 0.05 to 2 mole percent, and especially 0.1 to 1 mole percent hexadiene. In most instances, a relatively minor proportion of cis isomer is tolerably present, but the proportion should not be too high so that substantial catalyst deactivation and loss of molecular weight control by hydrogen during the copolymerization are avoided, e.g. not more than 15 percent of the hexadiene being the cis isomer. The 1,4-hexadiene is preferably at least 90 percent trans isomer, and especially 95 percent or more of the trans isomer. Trans-1,4-hexadiene of 90 percent or greater purity is commercially available from several sources, such as Aldrich Chemical Company and E. I. duPont.

The copolymer may have a melt flow rate (MFR) of from 0.5 to 500, preferably from 1 to 20, as determined in accordance with ASTM D-1238, condition 2.16 kg/230° C. (condition L).

The unsaturated copolymers of the present invention may be prepared by the polymerization of propylene and trans-1,4-hexadiene using a coordination catalyst. Catalysts for stereoregular (isotactic) polymerization of propylene are preferred, such as catalyst of the Ziegler-type essentially composed of a transition metal halide and a reducing compound. Ziegler catalysts wherein the transition metal halide is titanium trichloride are especially preferred.

A particularly preferred titanium trichloride Ziegler-type catalyst composition is described in U.S. Pat. No. 4,295,991 which is hereby incorporated herein by reference. Briefly, this catalyst is non-friable, highly active and is obtained by reducing titanium tetrachloride to a titanium trichloride reduced solid product in the presence of an organo aluminum compound at a low temperature, e.g., in the range of about −50° C. to about 30° C., contacting the titanium trichloride reduced solid product with a minor amount of an α-olefin having at least three carbon atoms under polymerization conditions to obtain a titanium trichloride reduced solid product containing from about 1 to about 1,000 weight percent of prepolymerized α-olefin based on the weight of titanium trichloride, thereby providing prepolymerized TiCl$_3$ reduced solid, and thereafter treating the prepolymerized titanium trichloride reduced solid product with one of (a) a chlorinated hydrocarbon having at least two carbon atoms and a Lewis base complexing agent, or with (b) a Lewis acid such as TiCl$_4$ and a Lewis base complexing agent, to convert the prepolymerized titanium trichloride reduced solid to a highly active, crystalline prepolymerized titanium trichloride composition. This catalyst may also include an organometallic cocatalyst such as an alkyl aluminum dichloride, dialkyl aluminum chloride, trialkyl aluminum and the like.

Another preferred catalyst is a solid-supported catalyst, for example, the combination of a supported titanium catalyst component and an organoaluminum compound, such as that described in U.S. Pat. No. 4,366,296 which is hereby incorporated herein by reference. Briefly, the catalyst component is a reduced titanium compound supported with a magnesium halide composition. The catalyst may also include a third component such as iodine or an electron donor compound for enhancing the catalyst stereospecificity.

The manner of polymerization to be adopted in the present invention is not particularly restricted and includes a bulk, slurry or solution method, a slurry or solution method using an inert solvent, a gaseous phase method using substantially no liquid solvent in which each monomer is maintained under substantially gaseous condition, and the like. Slurry polymerization is preferred.

The copolymerization conditions are generally those used for the homopolymerization of propylene in the presence of a Ziegler catalyst. The polymerization temperature is usually in the range of about 0° to 200° C., preferably from ambient to 150° C. Pressure is usually in the range of about 1 to 100 atmospheres, preferably about 1 to 50 atmospheres.

In order to obtain the copolymers of the present invention, it is necessary that each monomer be present at the time of polymerization, but the comonomer ratio is not required to be constant with time. That is, it may be convenient to feed each monomer at a constant mixing ratio, or it is also possible to vary the monomer mixing ratio with time. Further, any of the monomers may be added in divided portions with consideration for the copolymerization reaction ratio. The copolymer thus produced may be referred to as a "random copolymer."

The term random copolymer as used herein means not only a copolymer wherein the propylene and the trans-1,4-hexadiene monomers are distributed perfectly at random, but a copolymer wherein the distribution of each monomer is not at any fixed distribution within the individual copolymer molecule.

Control of the molecular weight can be effected by using hydrogen, more hydrogen generally resulting in a lower molecular weight. The presence of hydrogen in the reaction mixture also tends to enhance the catalyst activity. The quantity of hydrogen preferably employed can vary from 0.01 mole percent up to 3 mole percent, on a basis of the monomer charge.

In addition, the copolymer compositions of the present invention may contain various additives in such proportions that do not impair the effects of the present invention. Such additives include, for example, antioxidants, thermal stabilizers, ultraviolet absorbents, antistatics, inorganic fillers (e.g., silica, mica, talc, calcium carbonate, carbon black, glass fibers, glass microspheres, carbon fibers, gypsum, clay, aluminum hydroxide, magnesium hydroxide, titanium oxide, etc.), colorants or pigments, flame retardants, surface active agents, cross-linking auxiliaries, and the like.

The copolymers of propylene and trans-1,4-hexadiene of the present invention are thermoplastic copolymers having many of the advantageous characteristics of homopolypropylene. The copolymers may be extruded and formed into objects, such as bottles or medical devices such as syringes, sutures, fibers, labware and the like. Once formed, the object can be subjected to radiation as a means of sterilization of the formed object. In contrast to conventional homopolypropylene which degrades when subjected to radiation, the copolymers of the present invention become cross-linked. The radiation sources which induce cross-linking include gamma-rays emitted from cobalt 60, cesium 137, etc., electron beams emitted from an electron accelerator, X-rays generated from an X-ray generator, ultraviolet rays, α-rays, etc. The preferred among them are gamma-rays from radiation sources that have become easily available owing to technical improvements of accelerators. In the present invention, use of electron rays is particularly convenient.

The cross-linking temperature at which radiation-induced cross-linking occurs is not particularly restricted. Usually, it is in the range between 10° C. and the melting point or softening point of the copolymer composition of the present invention, and preferably between 10° C. and 100° C. Temperatures out of the above range may also be used without any problem. There is no particular limitation to the atmosphere, and cross-linking can be effected under any of an air atmosphere, an inert gas atmosphere or a vacuum atmosphere.

Radiation doses may range from 0.01 to 50 Mrad, preferably 0.1 to 20 Mrad, and especially 1 to 10 Mrad, depending on the copolymer hexadiene content and the desired result. For commercial sterilization applications, 2.5 to 5.0 Mrad are common. At such radiation doses, the polypropylene copolymer surprisingly retains its elasticity and processability, particularly with a hexadiene content of 0.1 to 1 mole percent. This sharply contrasts with conventional homopolypropylene which becomes extremely brittle and has an impractically high MFR under such conditions.

The present invention is illustrated in greater detail by way of the following examples.

EXAMPLES 1-4 AND COMPARATIVE by differential scanning calorimetry, based on a second melt determined at a heating rate 10° C./min. the hydrogen concentration, monomer feed rates, and product physical properties are seen in Table I below, along with a comparison to homopolypropylene (Comparative Example A).

TABLE I

|  | COMPARATIVE EXAMPLE A | EXAMPLE 1 | EXAMPLE 2 | EXAMPLE 3 | EXAMPLE 4 |
|---|---|---|---|---|---|
| Hydrogen Concentration (mol % of monomers) | 0.50 | 0.38 | 0.90 | 2.20 | 2.20 |
| 1,4-Hexadiene Feed Rate (lb/hr) | 0.00 | 7.39 | 12.24 | 15.40 | 20.90 |
| Propylene Feed Rate (lb/hr) | 180.0 | 101.8 | 98.50 | 76.00 | 78.00 |
| Al/Ti Ratio | 12.0 | 29.00 | 8.50 | 8.40 | 48.00 |
| Catalyst Activity (lb polymer/lb catalyst) | 9000 | 8130 | 3515 | 2500 | 2680 |
| MFR (dg/min) | 1.0 | 0.59 | 1.24 | 3.72 | N/A |
| Diene Content (mol %) | 0.00 | 0.14 | 0.44 | 0.73 | 0.91 |
| HI (%) | >95 | — | — | 84 | — |
| MP (°C.) | 165.0 | 159.40 | 155.50 | 154.20 | 153.40 |

EXAMPLE A

Propylene/1,4-hexadiene copolymers were produced in a 150-gallon continuous stirred tank reactor. The polymerizations were conducted in liquid propylene at 158° F., 409 psig, and at a residence time of 4 hours. The preparation of the catalyst is described in Example 10 of U.S. Pat. No. 4,295,991. The cocatalyst used was a 15 weight percent diethylaluminum chloride (DEAC) solution in hexane. Sufficient catalyst was fed to produce polymer at a rate of 60 lb/hr. Cocatalyst feed rate was sufficient to maintain the Al/Ti ratio as shown in Table I below. The mole percentage of 1,4-hexadiene contained in the polymer was analyzed by proton NMR. The melt flow rate (MFR) of the copolymer was determined by ASTM D-1238, condition L (2.16 kg, 230° C.). The heptane insolubles (HI) were determined by measuring the fraction of polymer which remained in an extraction thimble following extraction with refluxing heptane in a Soxhlet extractor under nitrogen for 24 hours. The melting point (MP) was determined Samples of the propylene/1,4-hexadiene copolymers were injection molded at 250° C. to form tensile bars in a Boy injection molder with the mold temperature maintained at 45° C. The samples were then irradiated with gama radiation from a cobalt-60 source until the desired dosage (see Table II) was reached. All measurements were conducted within 30 days of the irradiation. The tensile strength at break and elongation at yield were measured per ASTM D-638. The MFR after irradiation was measured on molded samples which were ground to less than 4 mm in average particle size. The gel content was determined by measuring the fraction of polymer which remained in an extraction thimble following extraction with refluxing xylene in a Soxhlet extractor under nitrogen for 24 hours. The results are presented in Table II.

TABLE II

| RADIATION DOSAGE (MRad) | COMPARATIVE EXAMPLE A (0 mol % diene) | EXAMPLE 1 (0.14 mol % diene) | EXAMPLE 2 (0.44 mol % diene) | EXAMPLE 3 0.73 mol % diene | EXAMPLE 4 (0.91 mol % diene) |
|---|---|---|---|---|---|
| | TENSILE STRENGTH AT BREAK (PSI) | | | | |
| 0.00 | 3,649 | 4,740 | 4,055 | 3,035 | 2,979 |
| 2.14 | 3,090 | 4,692 | 3,760 | 3,407 | 3,074 |
| 5.52 | 4,310 | 4,316 | 3,849 | 3,266 | 3,202 |
| 10.17 | 5,449 | 5,149 | 4,503 | 3,310 | 3,141 |
| | ELONGATION AT BREAK (%) | | | | |
| 0.0 | 73 | 35 | 35 | 460 | 451 |
| 2.14 | 43 | 30 | 38 | 421 | 424 |
| 5.52 | 27 | 25 | 36 | 317 | 273 |
| 10.17 | 11 | 21 | 27 | 180 | 60 |
| | GEL CONTENT | | | | |
| 0.00 | 0.0 | 0.8 | 0.1 | 0.0 | 0.0 |
| 2.14 | 0.0 | 0.0 | 0.0 | 0.0 | 31.0 |
| 5.52 | 0.0 | 0.5 | 32.0 | 38.3 | 53.9 |
| 10.17 | 0.0 | 28.8 | 52.6 | 56.8 | 66.9 |
| | MFR (dg/min) | | | | |
| 0.00 | 13.12 | 0.59 | 1.24 | 3.72 | 16.10 |
| 2.14 | 54.97 | 4.84 | 3.07 | 5.30 | 2.50[1] |
| 5.52 | 147.41 | 9.62 | 0.66[1] | 1.78[1] | 4.13[2] |
| 10.17 | 310.94 | 1.73 | 0.65[2] | 0.65[2] | 0.39[2] |

NOTES FOR TABLE II:
[1] The sample was largely molten, but had numerous rough, angular edges, indicating incomplete melting.
[2] The sample passed through the melt indexer largely unmolten. These samples consisted of the ground plaque stuck together to various degrees.

Increasing brittleness occurs on irradiation when no diene is present (Comparative Example A). This is principally due to the decrease in molecular weight that occurs with irradiation. Some increase in tensile strength is observed at low levels of diene in the polymer (0.14 mole percent), but this is much smaller than that seen without diene. At moderate to high levels of diene (0.73-0.91 mole percent) and radiation dosages ranging from low to high (up to 10 MRad), the tensile strength is approximately constant. Polymer with no diene (Comparative Example A) degrades on exposure to radiation, decreases in molecular weight, and becomes brittle. As a result, it loses its elongational properties. Surprisingly, with only small amounts of diene (0.14 mole percent) and low amounts of cross-linking, the copolymer retains its initial elongational properties. As the level of diene increases, the polymer is able to retain elongation, even at the high dosages typically used for sterilization (2.5 to 5.0 Mrad). Only when catalyst (30% in mineral oil; prepared per Example 10 in U.S. Pat. No. 4,295,991) was weighed into a catalyst injection tube. The injection tube was then attached to an injection port on the reactor and to the monomer manifold. After allowing the reactor to equilibrate at 70° C., liquid propylene was pressured into the reactor through the catalyst tube, thereby introducing the catalyst into the reactor. The reaction was allowed to run at 70° C. and 1000 rpm for 60 minutes. The reaction was stopped by rapidly venting and cooling the vessel. Methanol and hexane were added to the polymer. The polymer was allowed to sit in the hexane/methanol solution approximately 1 hour, then filtered and dried. Reaction conditions and results are shown in Table III.

TABLE III

| EXAMPLE | AMOUNT OF 1,4-HEXADIENE COMONOMER (ml) | $H_2$ PRESSURE (psig) | REACTION TIME (min) | HEXADIENE IN COPOLYMER[2] (mole %) | MFR (dg/min) | YIELD (g) | CATALYST ACTIVITY (g polymer per g catalyst) |
|---|---|---|---|---|---|---|---|
| B[1] | 0 | 0.0 | 30 | 0.00 | — | 107.0 | 339.7 |
| C[1] | 0 | 15.4 | 30 | 0.00 | 19.10 | 200.0 | 740.7 |
| 5 | 10 | 0.0 | 60 | 0.19[3] | 0.16 | 54.2 | 100.4 |
| 6 | 10 | 14.6 | 30 | 0.10 | 7.30 | 112.0 | 350.0 |
| 7 | 10 | 16.1 | 43 | 0.22 | 14.10 | 227.2 | 511.3 |
| 8 | 25 | 18.0 | 30 | 0.20 | 19.10 | 125.0 | 342.5 |
| 9 | 50 | 0.0 | 30 | 0.20 | 0.04 | 15.6 | 51.1 |
| 10 | 50 | 5.1 | 30 | 1.03 | 7.04 | 57.2 | 204.3 |
| 11 | 50 | 20.0 | 30 | 0.83 | 60.10 | 75.0 | 288.5 |
| 12 | 100 | 15.01 | 60 | 2.05 | 108.80 | 30.0 | 245.3 |

NOTES FOR TABLE III
[1]Comparative Example.
[2]Determined by $^{13}C$ unless otherwise indicated.
[3]Determined by HNMR.

highly cross-linked at very high radiation dosages (over 10 Mrad) does the amount of elongation begin to show an excessive decrease.

The degree of cross-linking as reflected by gel formation is highly dependent on the amount of diene present in the copolymer. At very low levels of diene, high radiation dosages are needed to effect observable cross-linking. At increasing levels of diene, cross-linking occurs at reduced radiation dosages. The data also show the dependence of molecular weight on the amount of diene present. In the absence of diene (Comparative Example A), the polymer degrades to such a degree that the MFR becomes quite high. However, even at low levels of diene (see Example 1) the MFR does not increase significantly and remains in a range that is easily processable. At very high levels of diene, a large amount of cross-linking occurs at the higher radiation dosages, and the material cross-links to a degree that it does not flow when heated to a high temperature (see Example 4).

EXAMPLES 5-12 AND COMPARATIVE EXAMPLES B AND C

A one-liter stainless steel pressure vessel, equipped with an incline blade stirrer, an external water jacket for temperature control, a system inlet, a vent line, a catalyst injection tube, and regulated supplies of dry propylene, nitrogen and hydrogen, was dried and deoxygenated with a nitrogen flow. Diethyl aluminum chloride (24.8% in heptane) was injected into the vessel by a gas-tight syringe through the septum inlet. Trans-1,4-hexadiene (passed through alumina twice) was injected into the vessel using a gas-tight syringe through the septum inlet. Hydrogen was pressured into the reactor. Liquid propylene was then pressured into the reactor. The mixture in the vessel was stirred at 1000 rpm and heated to 70° C. While heating the reactor, 0.77 g of The data in Table III show the interdependence of hexadiene comonomer and hydrogen proportions on the copolymer hexadiene content and molecular weight, and also on the catalyst activity. Increased proportions of 1,4-hexadiene tend to increase molecular weight and decrease catalyst activity. The presence of hydrogen tends to decrease molecular weight and increase catalyst activity to the point where the molecular weight can be controlled on a practical scale and the catalyst activity is on a par with propylene homopolymerization.

COMPARATIVE EXAMPLE D

This example demonstrates the use of the catalyst described in Example 10 of U.S. Pat. No. 4,295,991 for the homopolymerization of propylene. A one liter autoclave was freed of all air and moisture by purging with high-purity nitrogen at room temperature for 2 hours, then pressure purging to 150 psig with high purity nitrogen 3 times at 100° C. After cooling to 30° C. under flowing high purity nitrogen, 3.3 ml of 25% diethylaluminum chloride (DEAC) in heptane (obtained from Texas Alkyls) was added to the reactor. 15.0 Psig of hydrogen was added to the reactor. 250 Ml of dry, oxygen-free propylene was added to the reactor. The reactor was then heated to 70° C. Two hundred milligrams of catalyst (as described in Example 10 of U.S. Pat. No. 4,295,991) was then washed into the reactor with an additional 250 ml of dry, oxygen-free propylene. The polymerization was allowed to proceed for 1 hour. The polymerization was stopped by cooling to room temperature and venting all of the propylene. The polymer was soaked in isopropanol for 1 hour in order to remove the catalyst. The polymer was then filtered and allowed to dry in air overnight. The polymer was then dried in a vacuum oven at 70° C. overnight and weighed. The diene content, MFR and HI were determined as described above. The results are included in Table IV below.

COMPARATIVE EXAMPLE E

The procedure described in Comparative Example D was repeated except that the hydrogen pressure was 30.0 psig. The results are included in Table IV below.

COMPARATIVE EXAMPLE F

The procedure described in Comparative Example D was repeated except that 25.0 ml of dry oxygen-free cis-1,4-hexadiene (cis-1,4-HD) (from Shell International Chemical Company) was added to the reactor after cooling with nitrogen and before DEAC addition. Prior to the polymerization the hexadiene had been passed over a 1 inch diameter column of basic alumina (Brockman Activity 5) from Baker Chemical Company, collected over 4 Å molecular sieves, and sparged with nitrogen for 30 minutes prior to use. The hydrogen pressure was 15.1 psig. All other conditions were identical to Comparative Example D. The results are included in Table IV below.

COMPARATIVE EXAMPLE G

The procedure described in Comparative Example F was repeated except that the hydrogen pressure was increased to 30.0 psig. The results are included in Table IV below.

EXAMPLE 13

The procedure described in Comparative Example F was repeated except that 25.0 ml of trans-1,4-hexadiene (trans-1,4-HD) (from the DuPont Chemical Company) was added to the reactor instead of cis-1,4-hexadiene. The trans-1,4-hexadiene was purified in exactly the same manner as the cis-1,4-hexadiene as described in Comparative Example F. The hydrogen pressure was 15.0 psig. The results are included in Table IV below.

EXAMPLE 14

The procedure described in Comparative Example G was repeated except that the hydrogen pressure was 30.0 psig. The results are shown in Table IV below.

TABLE IV

| EXAMPLE | COMONOMER | H₂ PRESSURE Psig | YIELD (g) | MFR (dg/min) | COPOLYMER DIENE CONTENT (mole %) | HI (%) |
|---|---|---|---|---|---|---|
| D | None | 15.0 | 124.6 | 7.0 | 0.0 | — |
| E | None | 30.0 | 137.5 | 6.8 | 0.0 | — |
| F | cis-1,4-HD | 15.1 | 63.8 | 210.0 | 0.3 | 76.7 |
| G | cis-1,4-HD | 30.0 | 73.3 | 570.0 | 0.38 | 77.6 |
| 13 | trans-1,4-HD | 15.0 | 76.9 | 14.5 | 0.7 | 82.2 |
| 14 | trans-1,4-HD | 30.0 | 106.5 | 231.0 | 0.65 | 77.8 |

EXAMPLES 15 THROUGH 17 AND COMPARATIVE EXAMPLE H

Tensile bars of propylene homopolymer (Comparative Example H) and trans-1,4-hexadiene copolymers having different diene contents were prepared. The diene levels were as follows:

| EXAMPLE | TRANS-1,4-HEXADIENE CONTENT (mole %) |
|---|---|
| H | 0 |
| 15 | 0.75 |
| 16 | 0.77 |
| 17 | 0.91 |

These samples were injection molded to 90 mil thickness on a 75 ton Van Dorn injection molding machine to produce samples for tensile testing (per ASTM D-638). The samples were irradiated at room temperature and in air with a Dynamation electron beam unit. A 19 milliamp electron beam current accelerated at 4.5 Mev was scanned over 99.9% of one side of the samples. The samples were received dosages of 2.5, 5.0, 10.0 and 20.0 MRads. After irradiation, the samples were tested according to the procedures described in ASTM D-638. The MFR and gel contents were measured as described in Examples 1–4 above. The results are shown in Table V.

TABLE V

| RADIATION DOSAGE (MRad) | COMPARATIVE EXAMPLE H (0 mol % diene) | EXAMPLE 15 (0.14 mol % diene) | EXAMPLE 16 (0.44 mol % diene) | EXAMPLE 17 (0.91 mol % diene) |
|---|---|---|---|---|
| | MFR (dg/min) | | | |
| 0.0 | 2.5 | 2.7 | 4.1 | 16.8 |
| 2.5 | 21.9 | 0.7 | 2.0 | 20.7 |
| 5.0 | 65.4 | 0.2 | 7.9* | 10.7* |
| 10.0 | 138.7 | * | * | 17.4* |
| 20.0 | 263.5 | * | * | * |
| | GEL CONTENT (wt %) | | | |
| 0.0 | 1.4 | 1.5 | 3.5 | 0.6 |
| 2.5 | 0.4 | 38.1 | 5.3 | 6.6 |
| 5.0 | 0.5 | 59.3 | 29.0 | 28.2 |
| 10.0 | 0.0 | 60.4 | 58.6 | 60.3 |
| 20.0 | 0.0 | 70.9 | 71.2 | 73.9 |
| | ELONGATION AT BREAK (%) | | | |
| 0.0 | 101 | 483 | 653 | 205 |
| 2.5 | 94 | 408 | 559 | 156 |
| 5.0 | 151 | 312 | 416 | 146 |
| 10.0 | 131 | 145 | 403 | 70 |
| 20.0 | 10 | 63 | 76 | 38 |
| | TENSILE STRENGTH AT BREAK (psi) | | | |

TABLE V-continued

| RADIATION DOSAGE (MRad) | COMPARATIVE EXAMPLE H (0 mol % diene) | EXAMPLE 15 (0.14 mol % diene) | EXAMPLE 16 (0.44 mol % diene) | EXAMPLE 17 (0.91 mol % diene) |
| --- | --- | --- | --- | --- |
| 0.0 | 3119 | 3507 | 3605 | 2949 |
| 2.5 | 3009 | 3062 | 3270 | 2838 |
| 5.0 | 1485 | 3339 | 2585 | 2702 |
| 10.0 | 1426 | 3200 | 3085 | 2658 |
| 20.0 | 4138 | 2994 | 1626 | 2536 |

Note:
*Sample was not entirely melted; unmolten chunks of polymer were observed.

These results show that the molecular weight of the PP/trans-1,4-hexadiene copolymers increases after being exposed to electron beam irradiation. The homopolymer undergoes considerable degradation with as little as 2.5 MRads of radiation. In the case of higher dosages, cross-linking was so extensive as to prevent the sample from completely melting. The gel content data in Table V show the extent to which cross-linking occurred after irradiation with an electron beam. Whereas the homopolymer sample was completely soluble, the gel contents of the irradiated copolymers increased dramatically, exceeding 70% gel at 20 Mrads. This demonstrates the effectiveness of small amounts of trans-1,4-hexadiene for increasing the molecular weight of PP/trans-1,4-hexadiene copolymers after exposure to radiation sources. Irradiation of homopolymer also results in a dramatic loss of tensile properties as the polymer degrades to a much lower molecular weight material. Since the molecular weight of the PP/trans-1,4-hexadiene copolymers increased with irradiation, the samples retained their elongational and tensile strength properties until they were so highly cross-linked that they became an intractable mass. At that point they were no longer extensive and their elongation decreased rapidly. At higher diene contents, this occurred at lower dosages. Only when the gel contents exceeded about 60% did the samples begin to lose their elongation properties.

The foregoing is illustrative and explanatory of the invention only. Variations and modifications in the details thereof will be apparent to the skilled artisan. All such variations and modifications within the scope or spirit of the appended claims are intended to be embraced thereby.

What is claimed is:

1. A thermoplastic copolymer, comprising repeating units of:
   propylene; and
   trans-1,4-hexadiene.

2. The copolymer of claim 1, wherein said trans-1,4-hexadiene comprises from 0.01 to 5 mole percent of the copolymer.

3. The copolymer of claim 1, wherein the copolymer has a melt flow rate from 0.5 to 500.

4. The copolymer of claim 1, wherein the copolymer is essentially free of cis-1,4-hexadiene.

5. The copolymer of claim 1, wherein the copolymer is radiation crosslinked to a gel content of from 5 to 75 weight percent.

6. A thermoplastic copolymer comprising:
   propylene; and
   from 0.01 to 5 mole percent 1,4-hexadiene essentially free of cis isomer, wherein the copolymer has a melt flow rate of from 0.5 to 500, said copolymer being stabilized against molecular weight degradation from exposure to radiation.

7. The copolymer of claim 6, wherein the 1,4-hexadiene comprises from 0.1 to 2 mole percent of the copolymer.

8. The copolymer of claim 6, wherein the 1,4-hexadiene comprises at least 85 percent of the trans isomer thereof.

9. The copolymer of claim 6, wherein the copolymer melt flow rate is from 1 to 20.

10. The copolymer of claim 6, cross-linked to a gel content of from 5 to 75 percent.

11. The copolymer of claim 10, wherein the gel content is at least 20 percent.

12. A method of preparing radiation stabilized thermoplastic propylene copolymer, comprising:
   polymerizing propylene in a reaction mixture including trans-1,4-hexadiene and a coordination polymerization catalyst, wherein the reaction mixture includes sufficient 1,4-hexadiene and sufficient propylene to obtain a copolymer comprising from 0.01 to 5 mole percent 1,4-hexadiene and from 95 to 99.99 mole percent propylene.

13. The method of claim 12, wherein the reaction mixture is essentially free of cis-1,4-hexadiene.

14. The method of claim 13, wherein the 1,4-hexadiene is at least 85 percent trans isomer.

15. The method of claim 12, wherein the reaction mixture includes hydrogen for controlling the molecular weight of the copolymer.

16. The method of claim 12, wherein the catalyst is a Ziegler catalyst.

17. The method of claim 12, further comprising forming the copolymer into a shaped article.

18. The method of claim 17, further comprising cross-linking the copolymer by irradiation of the shaped article with ionizing radiation.

19. The method of claim 18, wherein said irradiation is at from 0.1 to 20 Mrad.

20. The method of claim 19, wherein said irradiation is at from 0.5 to 10 Mrad.

* * * * *